(12) United States Patent
Bourne et al.

(10) Patent No.: US 8,943,364 B2
(45) Date of Patent: Jan. 27, 2015

(54) APPLIANCE FOR STORING, MANAGING AND ANALYZING PROBLEM DETERMINATION ARTIFACTS

(75) Inventors: Donald A. Bourne, Toronto (CA); Roger M. Meli, Raleigh, NC (US); Carolyn H. Norton, Ann Arbor, MI (US); Thomas S. Wallace, Hillsborough, NC (US); Michael L. Wamboldt, Garner, NC (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 12/771,389

(22) Filed: Apr. 30, 2010

(65) Prior Publication Data

US 2011/0271150 A1 Nov. 3, 2011

(51) Int. Cl.
*G06F 11/00* (2006.01)
*G06F 11/07* (2006.01)
*G06F 11/14* (2006.01)

(52) U.S. Cl.
CPC .......... *G06F 11/079* (2013.01); *G06F 11/0709* (2013.01); *G06F 11/0748* (2013.01); *G06F 11/1446* (2013.01)
USPC .............................. 714/26; 714/39; 714/47.3

(58) Field of Classification Search
USPC ....................... 714/26, 25, 39, 47.3
See application file for complete search history.

(56) References Cited

U.S. PATENT DOCUMENTS

| | | | |
|---|---|---|---|
| 6,767,325 B2 * | 7/2004 | Iliff | 600/300 |
| 7,028,225 B2 | 4/2006 | Maso et al. | |
| 7,082,554 B2 * | 7/2006 | Wilson et al. | 714/43 |
| 7,251,584 B1 * | 7/2007 | Perazolo et al. | 702/183 |
| 7,360,202 B1 | 4/2008 | Seshadri et al. | |
| 7,992,053 B2 * | 8/2011 | Akiyama et al. | 714/47.1 |
| 8,302,191 B1 * | 10/2012 | Conrad et al. | 726/23 |
| 2004/0085359 A1 * | 5/2004 | Steg et al. | 345/771 |
| 2004/0103121 A1 * | 5/2004 | Johnson et al. | 707/200 |
| 2005/0015678 A1 * | 1/2005 | Miller | 714/38 |
| 2005/0222813 A1 * | 10/2005 | Bjornson | 702/183 |
| 2006/0085108 A1 * | 4/2006 | Grier et al. | 701/29 |
| 2006/0095230 A1 * | 5/2006 | Grier et al. | 702/183 |
| 2006/0271339 A1 * | 11/2006 | Fukada | 702/185 |
| 2006/0277283 A1 | 12/2006 | Bower, III et al. | |
| 2007/0027653 A1 * | 2/2007 | Godara | 702/183 |

(Continued)

OTHER PUBLICATIONS

Shenk, Jerry, The SANS 2007 Log Management Market Report, 2007, pp. 1-17, SANS Institute, US.

(Continued)

*Primary Examiner* — Loan L. T. Truong
(74) *Attorney, Agent, or Firm* — Jordan IP Law, LLC

(57) ABSTRACT

Systems and methods of managing problem determination (PD) data provide for obtaining PD data from a plurality of data sources via an input/output (I/O) interface of a data management device and storing the PD data to a memory of the data management device. In addition, an automated diagnostic analysis of the PD data may be conducted on the data management device. An automated discovery manager may provide the ability to find new sources of PD data and to either reconfigure remote systems to send data to the data management device or to automatically retrieve data from remote systems on a configurable schedule. Dynamically updateable database of symptom information can also be used, wherein the data management device may include a dynamically updateable set of analysis modules with which to conduct analysis on the PD data.

19 Claims, 2 Drawing Sheets

(56) References Cited

U.S. PATENT DOCUMENTS

| | | | |
|---|---|---|---|
| 2007/0088682 A1* | 4/2007 | Kitamura | 707/3 |
| 2007/0088744 A1* | 4/2007 | Webber et al. | 707/104.1 |
| 2007/0174844 A1* | 7/2007 | Adams et al. | 719/318 |
| 2007/0185929 A1* | 8/2007 | Azoulay et al. | 707/203 |
| 2008/0065577 A1* | 3/2008 | Chefalas et al. | 706/47 |
| 2008/0091384 A1* | 4/2008 | Subramanian et al. | 702/185 |
| 2008/0140469 A1* | 6/2008 | Iqbal et al. | 705/7 |
| 2008/0256404 A1* | 10/2008 | Funatsu | 714/724 |
| 2009/0043825 A1* | 2/2009 | Bourne et al. | 707/202 |
| 2009/0049338 A1* | 2/2009 | Unnikrishnan et al. | 714/26 |
| 2009/0083588 A1* | 3/2009 | Yamashita | 714/47 |
| 2009/0083695 A1* | 3/2009 | Mir et al. | 717/104 |
| 2009/0106597 A1* | 4/2009 | Branca et al. | 714/38 |
| 2009/0119536 A1* | 5/2009 | Guo et al. | 714/4 |
| 2009/0172034 A1* | 7/2009 | Aoyama et al. | 707/104.1 |
| 2009/0217101 A1* | 8/2009 | Becker | 714/39 |
| 2009/0254999 A1 | 10/2009 | Julin et al. | |
| 2009/0259441 A1* | 10/2009 | Yoshikai et al. | 703/1 |
| 2009/0265694 A1* | 10/2009 | Bakowski | 717/131 |
| 2010/0083029 A1* | 4/2010 | Erickson et al. | 714/2 |
| 2010/0131952 A1* | 5/2010 | Akiyama et al. | 718/100 |
| 2010/0205293 A1* | 8/2010 | Hu et al. | 709/224 |
| 2010/0227553 A1* | 9/2010 | Charrat et al. | 455/41.1 |
| 2010/0318855 A1* | 12/2010 | Beg et al. | 714/39 |
| 2011/0119231 A1* | 5/2011 | Namburu et al. | 707/609 |
| 2011/0264956 A1* | 10/2011 | Ito et al. | 714/20 |
| 2011/0265184 A1* | 10/2011 | Sakaki | 726/25 |
| 2011/0321122 A1* | 12/2011 | Mwangi et al. | 726/1 |
| 2012/0144009 A1* | 6/2012 | Noguchi et al. | 709/223 |

OTHER PUBLICATIONS

Holub, Viliam et al., Run-Time Correlation Engine for System Monitoring and Testing, Jun. 16, 2009, pp. 9-17, ICAC-INDST'09, ACM 978-1-60558-612-0/09/06, Barcelona, Spain.

* cited by examiner

APPLIANCE FOR STORING, MANAGING AND ANALYZING PROBLEM DETERMINATION ARTIFACTS

BACKGROUND

1. Technical Field

Embodiments of the present invention generally relate to the processing of problem determination artifacts. More particularly, embodiments relate to the use of an integrated data management device to collect, store, manage and analyze problem determination artifacts.

2. Discussion

While certain modern day software applications might be configured to generate log files to document operations, effective management and utilization of these log files may not always be achieved under conventional approaches. For example, many IT (information technology) architectures may only provide for manually intensive analysis of the log files on an ad hoc basis. Indeed, when a problem occurs, the number and size of the log files may increase sharply, which can further reduce the effectiveness of the log file management operations.

BRIEF SUMMARY

Embodiments may provide for a data management device having a processor, an input/output (I/O) interface and a computer readable storage medium having computer usable code stored thereon. If executed by the processor, the computer usable code can cause the data management device to obtain problem determination data from a plurality of data sources via the I/O interface and store the problem determination data to the computer readable storage medium. The computer usable code may also cause the data management device to conduct an automated diagnostic analysis of the problem determination data.

Other embodiments may involve a method in which problem determination data is obtained from a plurality of data sources via an I/O interface of a data management device. The method can also provide for storing the problem determination data to a memory of the data management device and conducting an automated diagnostic analysis of the problem determination data on the data management device.

In addition, embodiments can include a computer program product having a computer readable storage medium and computer usable code stored on the computer usable storage medium. If executed by a processor, the computer usable code may cause a data management device to obtain problem determination data from a plurality of data sources, store the problem determination data to a memory, and conduct an automated diagnostic analysis of the problem determination data.

Embodiments may also provide for a method in which an analysis policy is downloaded from a symptom database server and a data source is identified, wherein the data source includes at least one of an application, a network device, a storage device, a database and a server. Problem determination data can be obtained from the data source via an I/O interface of a data management device. The method may also provide for storing the problem determination data to a memory of the data management device and updating a discovery data based on the data source if the discovery database does not contain the data source. An automated diagnostic analysis of the problem determination data can be conducted on the data management device based on the analysis policy, and at least one of an event and a report may be generated based on the automated diagnostic analysis. The method may also provide for repeating the identifying, obtaining, storing, updating, conducting and generating for a plurality of data sources.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1A:
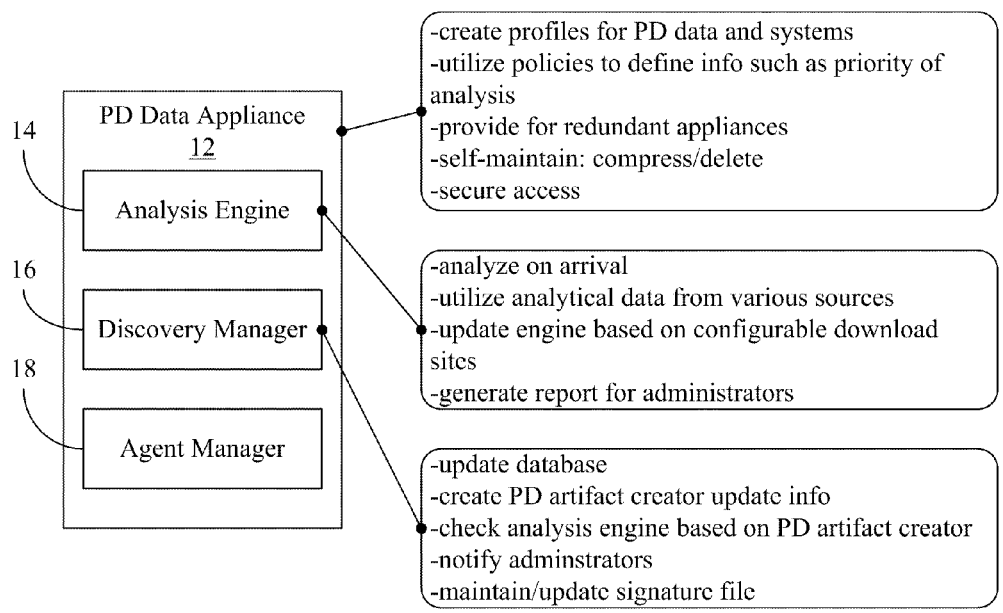
FIG. 1A is a block diagram of an example of a problem data appliance according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
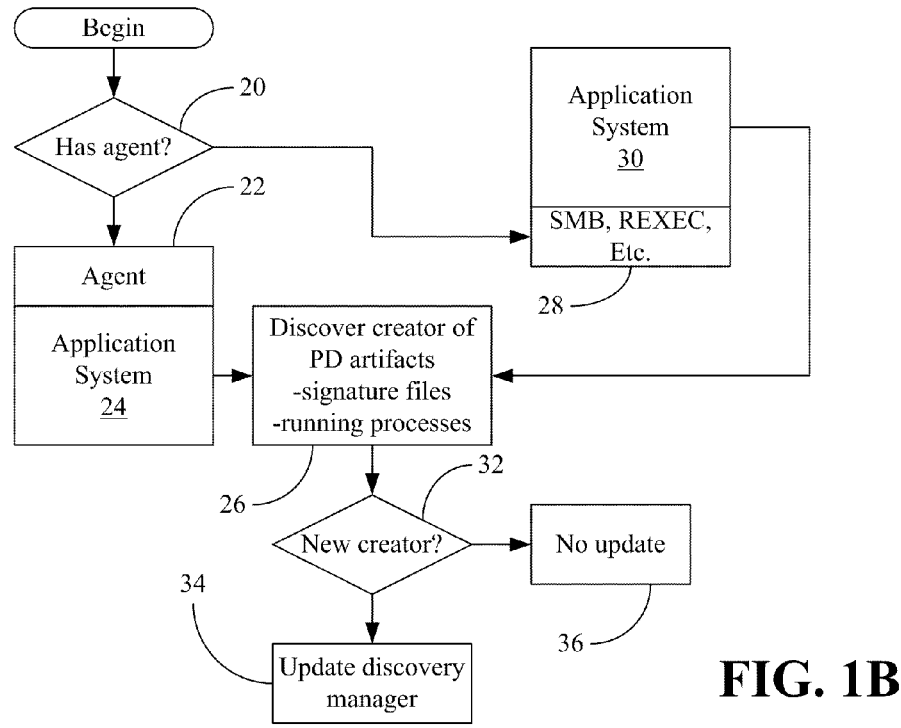
FIG. 1B is a flowchart of an example of a method of operating an agent manager according to an embodiment.

Referring now to FIGS. 1A and 1B, a scheme 10 of implementing a problem determination (PD) data management device/appliance 12 is shown. Generally, the appliance 12 may discover (at intervals or on command) PD data (e.g., logs, traces, dumps, etc.), create profiles for the PD data and corresponding application systems, utilize policies to define information such as the priority of analysis of the PD data, enable redundancy, self-maintain the PD data stored thereon (including data compression and/or deletion), and provide for secure access. In the illustrated example, the appliance 12 includes an analysis engine 14, a discovery manager 16 and an agent manager 18, wherein the engine 14 and managers 16, 18 could be implemented in executable software as a set of firmware and/or logic instructions stored in a machine- or computer-readable storage medium of a memory such as random access memory (RAM), read only memory (ROM), programmable ROM (PROM), flash memory, etc., as fixed-functionality hardware using circuit technology such as ASIC, complementary metal oxide semiconductor (CMOS) or transistor-transistor logic (TTL) technology, or any combination thereof.

The illustrated agent manager 18 determines at processing block 20 whether a target machine has a PD data discovery agent 22. The target machine might be a remote application server, storage device, or network device, as well as an application or database contained thereon (e.g., a virtual machine or component thereof). If so, the agent 22 may be queried to identify a data source on the target machine such as an application system 24, wherein the illustrated application system 24 uses certain running processes and generates various signature files before, during and/or after operation of the application system 24. If not, the target machine is queried using well known protocols (SMB, REXEC, etc) to identify data sources on the machine.

If a particular data source on the target machine does not have a corresponding PD data discovery agent (or the target machine does not have a PD data discovery agent at all), the agent manager 18 may use a remote access process to execute one or more remote commands on the target machine. For example, an SMB (server message block) protocol or REXEC (remote execution) protocol command could be used at block 28 to identify an application system 30 (e.g., a data source), which might also use certain running processes and generate various signature files. In either case, block 26 provides for discovering the PD data creator/source associated with these processes and signature files.

If it is determined at block 32 that the creator of the PD data is a newly discovered source (e.g., a discovery database does not contain the source), block 34 provides for updating the discovery database based on the data source. For example, the update might involve adding identifiers for the application system(s) 24, 30 as well as identifiers for their respective process and/or signature files to the discovery database. If the creator of the PD data is not a new source, the illustrated process terminates at block 36. The illustrated agent manager 18 process may also be repeated for a plurality of data sources.

As already noted, the illustrated appliance 12 also includes a discovery manager 16. The discovery manager 16 can have functionality to perform a number of functions such as updating the discovery database with new and modified PD data creator information, notifying administrators of updates, maintaining/updating signature file information, and obtaining PD data from the various creators identified in the discovery database. The illustrated discovery manager 16 may also confer with the analysis engine 14 regarding the PD data creator information contained in the discovery database, wherein the analysis engine may conduct automated diagnostic analysis (e.g., root cause and/or failure analysis) of the PD data based on one or more analysis policies. The analysis policies might be downloaded from external sources such as symptom database servers, etc. In particular, the analysis engine 14 may analyze data as it arrives to detect patterns of events that may indicate operational problems. The analysis engine 14 may also send operational events or notifications to management systems and/or operators or system administrators.

In one approach, the PD data could be obtained by retrieving (i.e. pulling) the data from one or more of the data sources. Additionally, the appliance 12 may configure remote data sources to send the PD data as dictated by the appliance 12.

For example, the discovery manager 16 might transmit configuration data to one or more data sources, wherein the configuration data instructs the data sources to transmit PD data to the appliance 12 based on a particular scheduling policy. Moreover, the analysis engine 14 can conduct the automated diagnostic analysis upon arrival of the PD data (e.g., in real-time).

Figure 2:
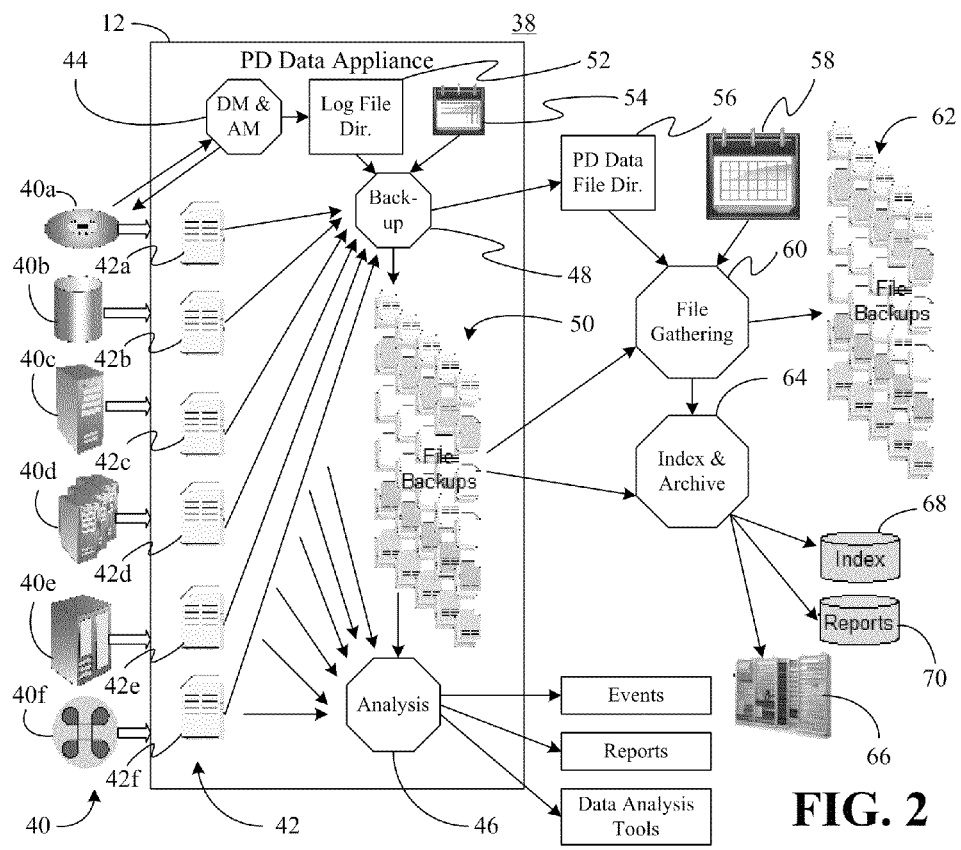
FIG. 2 is a block diagram of an example of a problem determination data management architecture according to an embodiment.

FIG. 2 shows an architecture 38 in which a PD data management appliance 12 is used to manage, store and analyze large amounts of log and trace information. In the illustrated example, data sources (e.g., creators) 40 (40a-40f) can include applications, network devices, storage devices, databases, servers, and so on, that create one or more corresponding PD data files 42 (42e-42f) such as logs, traces and dumps, to document the operational characteristics of the sources 40. As will be discussed in greater detail, the appliance 12 may communicate with the data sources 40 via a high speed input/output (I/O) connection and can contain a relatively large amount of internal memory. The appliance 12 may also include discovery and agent manager logic 44 to implement the discovery manager 16 and agent manager 18 (FIG. 1), already discussed. Thus, the illustrated discovery and agent manager logic 44 identifies the data sources 40, and configures the data sources 40 for transfer of the PD data files 42 to the internal memory of the appliance 12. The discovery and agent manager logic 44 may therefore pull the PD data files 42 from the data sources 40, or configure the data sources 40 to transmit the PD data files 42 to the appliance 12 according to one or more policies (e.g., scheduling policy) set by the appliance 12.

In addition, the appliance 12 may include a backup engine 48, which may generate file backups 50 of the PD data files 42 based on a log file directory 52 from the discovery and agent manager logic 44 and a user programmable schedule 54. For example, the backup engine 48 might be configured to run a file backup on a daily basis outside of normal business hours. In the illustrated example, the file backups 50 are also stored to internal memory of the appliance 12.

The backup engine 48 may also register the file backups 50 with a PD data file directory 56, which may be used along with a schedule 58 by a file gathering component 60 to create external file backups 62. In addition, an index and archive component 64 can generate an index 68 and reports 70 of the internal file backups 50 and/or the external file backups 62 for usage by a data archive 66, wherein the file gathering component 60 may be responsible for moving the backups to an external media (disk/tape/etc). The index and archive component 64 may also generate indices 68 and reports 70 of the archived data.

The illustrated appliance 12 also includes one or more analysis engines 46, which have functionality similar to that of the analysis engine 14 (FIG. 1), already discussed. In particular, the analysis engines 46 may use external information such as symptom databases and/or downloadable/pluggable analysis modules to conduct automated diagnostic analyses of the PD data files 42 as they arrive and to generate one or more events (e.g., notifications, alarms, triggers) and/or reports (e.g., historical reports) based on the diagnostic analyses. The results of the diagnostic analysis could also be provided to other data analysis tools.

Figure 3:
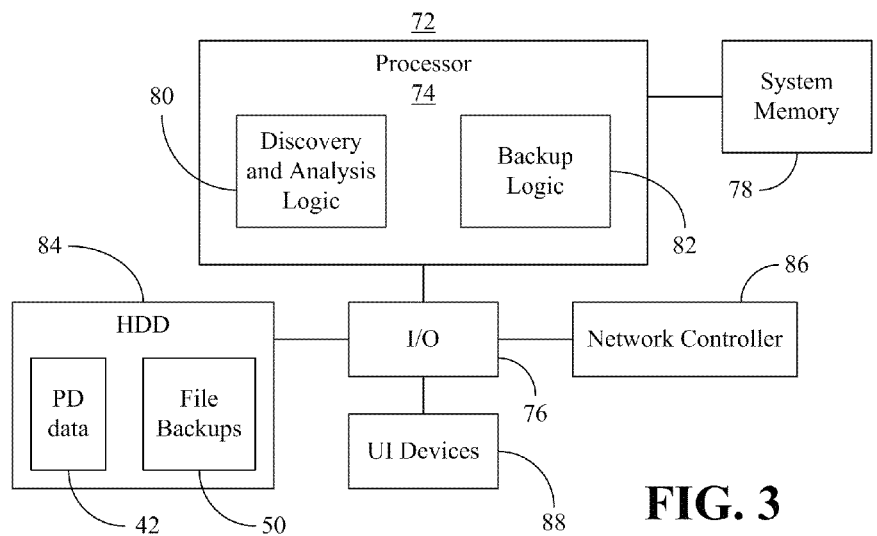
FIG. 3 is a block diagram of an example of a data management device according to an embodiment.

Turning now to FIG. 3, a data management device/appliance 72 is shown. The illustrated device 72, which may be readily substituted for the PD data management appliance 12 (FIGS. 1 and 2), already discussed, provides an integrated solution to advanced management analysis of PD data. In particular, the device 72 may include a processor 74 coupled to an input/output (I/O) interface/device 76 and system memory 78, a network controller 86, user interface (UI) devices 88 (e.g., browser, display, keypad, mouse, etc. in order to allow a user to interact with and perceive information from the data management device), and a high capacity computer readable storage medium such as a hard disk drive (HDD) 84, solid state disk (SSD), etc. The system memory 78 may be configured as dynamic random access memory (DRAM) modules that could be incorporated into a single inline memory module (SIMM), dual inline memory module (DIMM), small outline DIMM (SODIMM), and so on.

In one example, the processor 74 executes discovery and analysis logic 80 and backup logic 82 retrieved from the system memory 78, internal or external caches, or other computer readable storage media such as HDD 84. The discovery and analysis logic 80 may include functionality similar to that of the discovery and agent manager logic 44 and analysis engines 46 (FIG. 2), already discussed. Thus, the discovery and analysis logic 80 may obtain PD data 42 from a plurality of data sources via the I/O device 76 and/or network controller 86, store the PD data files 42 to the HDD 84, and conduct an automated diagnostic analysis of the PD data files 42. The network controller 86 connection to the data sources might include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances.

In addition, the backup logic 82, which can have functionality similar to that of the backup engine 48 (FIG. 2), already discussed, may be used to create internal file backups 50 of the PD data files 42.

Thus, the illustrated approach can pull the appropriate log data from remote storage devices and provides plug-and-play capability, with integrated management, data archiving, and problem analysis capabilities. Indeed, the device 72 can function as a "smart disk" that discovers logs, dumps, and other PD files, archives them, manages them, and performs detailed analysis of the contents.

The illustrated device 72 might therefore be used to support security compliance and audit operations by archiving PD data and organizing it for data retrieval and records management compliance. Moreover, incident and problem analysis operations can be enhanced by using the device 72 to discover diagnostic data (log data, etc.), analyze it as it is gathered and produce reports regarding problem trend analysis, known problems, etc., to aid in root cause problem diagnostics. In addition, central management of PD data analysis (e.g., cloud computing) can be implemented using the techniques described herein. For example, live monitoring, report type computing could all benefit from the above-described techniques.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer-implemented method comprising:
    downloading an analysis policy from a symptom database server, wherein the analysis policy defines a priority to analyze problem determination data;
    querying an agent residing on a target machine to identify a source of the problem determination data and executing a remote command on a target machine to identify the source of the problem determination data when the target machine does not include the agent, wherein the source includes at least one of an application, a network device, a storage device, a database and a server;
    obtaining the problem determination data from the source via an input/output (I/O) interface of a data management device;
    storing the problem determination data to a computer readable storage medium of the data management device;
    updating a discovery database based on the source if the discovery database does not contain the source;
    conducting an automated diagnostic analysis of the problem determination data on the data management device based on the analysis policy, wherein the automated diagnostic analysis uses the analysis policy to detect a predetermined pattern of events indicating an operational problem;
    generating at least one of an event and a report based on the automated diagnostic analysis; and
    repeating the querying or executing, obtaining, storing, updating, conducting and generating for a plurality of sources.

2. The method of claim 1, wherein obtaining the problem determination data includes transmitting configuration data to at least one source, wherein the configuration data instructs the at least one source to transmit the problem determination data to the data management device.

3. The method of claim 1, wherein obtaining the problem determination data includes retrieving the problem determination data from at least one source.

4. A data management device comprising:
    a processor;
    an input/output (I/O) interface; and
    a computer readable storage medium having computer usable code stored thereon, where, if executed by the processor, the computer usable code causes the data management device to:
        download an analysis policy from a symptom database server, wherein the analysis policy is to define a priority to analyze the problem determination data,
        query an agent residing on a target machine to identify a source of the problem determination data and execute a remote command on a target machine to identify the source of the problem determination data when the target machine does not include the agent, wherein the source includes at least one of an application, a network device, a storage device, a database and a server,
        obtain the problem determination data from the source via the input/output (I/O) interface,
        store the problem determination data to the computer readable storage medium,
        update a discovery database based on the source if the discovery database does not contain the source,
        conduct an automated diagnostic analysis of the problem determination data based on the analysis policy, wherein the automated diagnostic analysis is to use the analysis policy to detect a predetermined pattern of events indicating an operational problem,
        generate at least one of an event and a report based on the automated diagnostic analysis, and
        repeat the querying or executing, obtaining, storing, updating, conducting and generating for a plurality of sources.

5. The data management device of claim 4, wherein the computer usable code, if executed by the processor, causes the data management device to,
    download computer usable code to implement an analysis module,
    install the analysis module in an analysis engine of the data management device, and
    use the analysis module to conduct the automated diagnostic analysis and generate at least one of the event and the report based on the automated diagnostic analysis.

6. The data management device of claim 4,
    wherein the source is to include at least one of an application, a network device, a storage device, a database and a server.

7. The data management device of claim 4, wherein the computer usable code, if executed by the processor, causes the data management device to transmit configuration data to at least one source, wherein the configuration data is to instruct the at least one source to transmit the problem determination data to the data management device based on a scheduling policy.

8. The data management device of claim 4, wherein the computer usable code, if executed by the processor, causes the data management device to retrieve the problem determination data from at least one source.

9. A computer-implemented method comprising:
    downloading an analysis policy from a symptom database server, wherein the analysis policy defines a priority to analyze the problem determination data;
    querying an agent residing on a target machine to identify a source of the problem determination data and executing a remote command on a target machine to identify the source of the problem determination data when the target machine does not include the agent, wherein the source includes at least one of an application, a network device, a storage device, a database and a server;
    obtaining the problem determination data from the source via an input/output (I/O) interface of a data management device;
    storing the problem determination data to a memory of the data management device;

updating a discovery database based on the source if the discovery database does not contain the source;

conducting an automated diagnostic analysis of the problem determination data on the data management device based on the analysis policy, wherein the automated diagnostic analysis uses the analysis policy to detect a predetermined pattern of events indicating an operational problem;

generating at least one of an event and a report based on the automated diagnostic analysis; and repeating the querying or executing, obtaining, storing, updating, conducting and generating for a plurality of sources.

10. The method of claim 9, further including:

download computer usable code to implement an analysis module;

install the analysis module in an analysis engine of the data management device; and use the analysis module to conduct the automated diagnostic analysis and generate at least one of the event and the report based on the automated diagnostic analysis.

11. The method of claim 9 wherein the source includes at least one of an application, a network device, a storage device, a database and a server.

12. The method of claim 9, wherein obtaining the problem determination data includes transmitting configuration data to at least one source, wherein the configuration data instructs the at least one source to transmit the problem determination data to the data management device based on a scheduling policy.

13. The method of claim 9, wherein obtaining the problem determination data includes retrieving the problem determination data from at least one source.

14. A computer program product comprising:

a non-transitory computer readable storage medium; and computer usable code stored on the non-transitory computer readable storage medium, where, if executed by a processor, the computer usable code causes a data management device to:

download an analysis policy from a symptom database server, wherein the analysis policy is to define a priority to analyze problem determination data, query an agent residing on a target machine to identify a source of the problem determination data and execute a remote command on a target machine to identify the source of the problem determination data when the target machine does not include the agent, wherein the source includes at least one of an application, a network device, a storage device, a database and a server, obtain the problem determination data from the source, store the problem determination data to a memory, update a discovery database based on the source if the discovery database does not contain the source, conduct the automated diagnostic analysis of the problem determination data based on the analysis policy, wherein the automated diagnostic analysis is to use the analysis policy to detect a predetermined pattern of events indicating an operational problem, generate at least one of an event and a report based on the automated diagnostic analysis, and repeat the querying or executing, obtaining, storing, updating, conducting and generating for a plurality of sources.

15. The computer program product of claim 14, wherein the computer usable code, if executed by the processor, causes the data management device to, download computer usable code to implement an analysis module, install the analysis module in an analysis engine of the data management device, and use the analysis module to conduct the automated diagnostic analysis and generate at least one of the event and the report based on the automated diagnostic analysis.

16. The computer program product of claim 14 wherein the source is to include at least one of an application, a network device, a storage device, a database and a server.

17. The computer program product of claim 14, wherein the computer usable code, if executed, causes the data management device to transmit configuration data to at least one source, wherein the configuration data is to instruct the at least one source to transmit the problem determination data to the data management device based on a scheduling policy.

18. The computer program product of claim 14, wherein the computer usable code, if executed, causes the data management device to retrieve the problem determination data from at least one source.

19. The method of claim 1, wherein the source is identified to be an application associated with at least one of a process and a signature file, and wherein an identifier associated with one or more of the process and the signature file is added to the discovery database when the application is a newly discovered source.

* * * * *